(No Model.)
A. C. MARTIN.
CAR COUPLING.
No. 472,582. Patented Apr. 12, 1892.
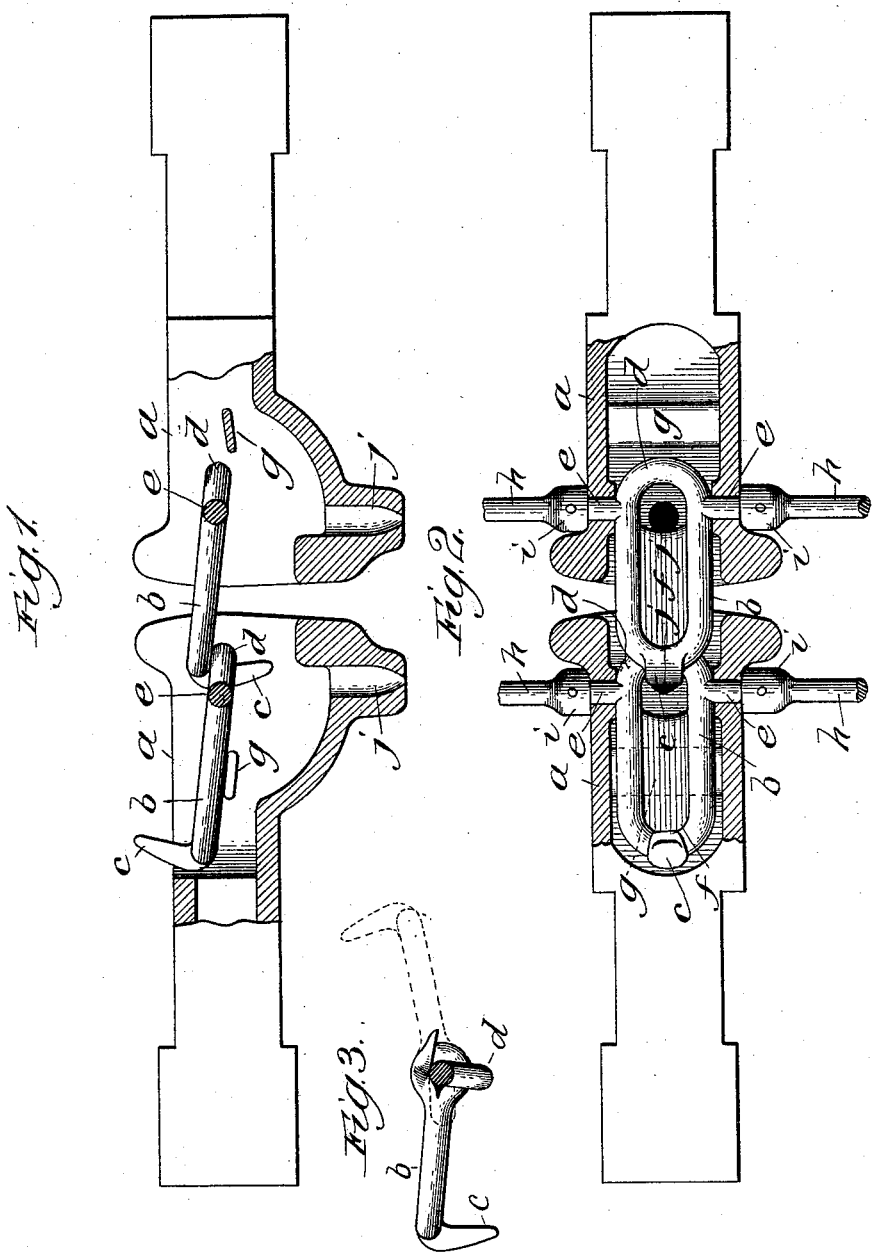

UNITED STATES PATENT OFFICE.

ALEXANDER C. MARTIN, OF CHICAGO, ILLINOIS.

CAR-COUPLING.

SPECIFICATION forming part of Letters Patent No. 472,582, dated April 12, 1892.

Application filed June 25, 1891. Serial No. 397,489. (No model.)

*To all whom it may concern:*

Be it known that I, ALEXANDER C. MARTIN, of Chicago, in the county of Cook and State of Illinois, have invented certain new and useful Improvements in Car-Couplers, of which the following is a full, clear, and exact description, reference being had to the accompanying drawings, forming a part of this specification, in which—

Figure 1 is a side view, partly in section, of a car-coupler embodying the features of my invention. Fig. 2 is a plan view thereof, the draw-heads being partly shown in horizontal section; and Fig. 3 is a detail view showing a modification of the coupling hook and link.

Like letters of reference in the different figures designate corresponding parts.

My invention relates to car-couplers, and embodies an improvement upon Letters Patent No. 436,796, granted to me September 23, 1890. In said Letters Patent I have shown a coupling device consisting of an elbow pivotally mounted in each draw-head and provided with a hook upon one arm and a slot or opening in the other to receive the hook in the opposite draw-head. This construction affords great freedom of action to conform to the vertical movement of the draw-heads; but the hooks may be displaced from the normal position when not desired.

The object of my present invention is to provide a car-coupler possessing all the advantages of movement of that described in said patent, while it may retain a normal position with less danger of becoming accidentally or carelessly displaced from the normal position, all of which is hereinafter more particularly described and claimed.

Referring to the drawings, $a$ represents a draw-bar head which is open at the top and within which is pivotally mounted a coupling device $b$, consisting of a single piece, preferably in the form of a link and which embodies both a hook and link, the hook $c$ being upon one end and the link $d$ upon the other. Nearest to the end forming the link $d$ I place trunnions $e\ e$, which are mounted in suitable bearings in the head, and thereby form the pivotal supports for said coupling device. I prefer to form a web $f$ in said coupling device approaching as near to said trunnions as may be convenient, in order to stiffen the same and prevent it from springing laterally. A cross-bar $g$ is formed in the head, which serves as a support for the coupling device $b$ when thrown back, as clearly shown in the drawings. Operating-bars $h\ h$ are attached to the trunnions by means of universal joints $i$, and are connected to the body of the car, so that the coupling device may be operated from either side of the car. A half-revolution of the operating-bars serves to couple or uncouple the draw-bar heads from each other.

One important advantage of my improved device as constructed is that the link or part $d$ is normally sustained in a horizontal or substantially horizontal position for the reception of the hook, while at the same time it permits of a free vertical play of the draw-bar heads. The part $d$ may also serve, when desired, in connection with the socket $j$, to support a coupling-pin for connection with an ordinary link. It is obvious that the part $d$ may be jointed at the pivotal point, as indicated in Fig. 3, so as to permit a limited movement thereof independently of that of the hook, while at the same time the weight of the latter may serve to sustain it normally in a horizontal or substantially horizontal position; but I prefer the construction shown in Figs. 1 and 2.

Having thus described my invention, I claim—

1. The combination, with a draw-bar, the head of which is closed at the bottom and open at the front and top, respectively, of a coupling device pivotally mounted within said head, said coupling device having a hook $c$ formed upon one end and a loop $d$ upon the other and arranged to rest normally in a horizontal or nearly horizontal position within the head, the pivotal point being near the end in which the loop is formed, and means for tilting the same upon its pivot, substantially as shown and described.

2. The combination of opposite draw-bars which are open at the front and top, respectively, and closed at the bottom, coupling-pins pivotally mounted within said heads, each having a hook upon one end and a loop upon the other, the pivotal point being nearest to the loop, means for sustaining the same normally in horizontal positions or substantially so within said heads, and means for tilting the same upon their pivots, substantially as shown and described.

In testimony whereof I have signed this specification, in the presence of two subscribing witnesses, this 18th day of June, 1891.

ALEXANDER C. MARTIN.

Witnesses:
D. H. FLETCHER,
JOS. BINGHAM.